(12) United States Patent
Ito (10) Patent No.: US 6,938,028 B1
(45) Date of Patent: Aug. 30, 2005

(54) IMAGE ENCRYPTING METHOD, IMAGE ENCRYPTING DEVICE, RECORDING MEDIUM ON WHICH IMAGE ENCRYPTING PROCEDURES ARE RECORDED, AND RECORDING MEDIUM ON WHICH ENCRYPTED IMAGE FILE IS RECORDED

(75) Inventor: Wataru Ito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/400,297

(22) Filed: Sep. 21, 1999

(30) Foreign Application Priority Data

Sep. 21, 1998 (JP) .................................. 10-266891

(51) Int. Cl.[7] ............................................ G06F 17/30
(52) U.S. Cl. ........................ 707/1; 707/104.1; 713/179
(58) Field of Search .............................. 707/2, 3, 5, 7, 707/10, 104.1, 103 Y; 382/100, 309, 321, 382/199; 358/444; 717/127; 713/176, 179; 711/100; 380/51

(56) References Cited

U.S. PATENT DOCUMENTS 5,502,576 A * 3/1996 Ramsay et al. ............. 358/444
5,664,030 A * 9/1997 Iizuka ......................... 382/321
5,748,805 A * 5/1998 Withgott et al. ............ 382/306
5,881,287 A * 3/1999 Mast ........................... 717/127

FOREIGN PATENT DOCUMENTS

| JP | A5-199424 | 8/1993 |
| JP | A6-125553 | 5/1994 |
| JP | 9-114431 | 5/1997 |

* cited by examiner

Primary Examiner—Charles Rones
Assistant Examiner—Hassan Mahmoudi
(74) Attorney, Agent, or Firm—Birch, Stewart, Kolasch & Birch, LLP

(57) ABSTRACT

An image encrypting method, an image encrypting device, a recording medium on which image encrypting procedures are recorded, and a recording medium on which an encrypted image file is recorded are provided in order to be able to respond to a request for transmission of a portion of an image and improve a rate of processing image data, even when a device which stores the encrypted image file is not authorized to decrypt. An image inputting device reads an image file. An image portion unit dividing device divides a read image file into a portion image data of tile units. An encrypting device encrypts the portion image data. An identifier generating device generates information incidental to the portion image data. A file generating device generates a single image file from the incidental information and encrypted portion image data.

20 Claims, 5 Drawing Sheets

IMAGE ENCRYPTING METHOD, IMAGE ENCRYPTING DEVICE, RECORDING MEDIUM ON WHICH IMAGE ENCRYPTING PROCEDURES ARE RECORDED, AND RECORDING MEDIUM ON WHICH ENCRYPTED IMAGE FILE IS RECORDED

BACKGROUND OF THE INVENTION

1. Field of the Invention

The present invention relates to an image encrypting method and device for encrypting an image and performing an image processing such as image synthesis on the encrypted image, a recording medium on which image encrypting procedures are recorded, and a recording medium on which an encrypted image file is recorded.

2. Description of the Related Art

Methods of encrypting such as disclosed in Japanese Patent Application Laid-Open (JP-A) No. 5-199424 or Japanese Patent Application Laid-Open (JP-A) No. 6-125553 have been known as conventional encrypting methods. JP-A-5-199424 describes a simple technique for a public key system or a common key system as a conventional encrypting method, and as another encrypting method, proposes a method in which an image is encrypted by changing the order of permutations of image blocks.

In JP-A-6-125553, a method of encrypting a portion of the image is proposed because encrypting of the entire image results in a large load. However, there is a slight decrease in reliability in the encrypting of a portion of the image as compared to the encrypting of the entire image. Accordingly, there are cases in which the entire image should be encrypted.

When the entire image is encrypted, naturally, the contents of the encrypted image data cannot be recognized by a device which is not authorized to decrypt.

For example, when an image server and an operator (image operator) are connected to each other via a network, in the case in which the image server does not have the authorization to decrypt and only the operator is authorized to decrypt, there is no method other than transmitting all of the image data, even if the operator requires only a portion of the image (e.g., a divisional tile when the image is divided into a grid, the resolution, or the like).

SUMMARY OF THE INVENTION

In view of the aforementioned, it is an object of the present invention to provide an image encrypting method, an image encrypting device, a recording medium on which image encrypting procedures are recorded, and a recording medium on which an encrypted image file is recorded, which can meet the demand for transmitting a portion of image data and can improve the processing rate even when a device which stores encrypted image data is not authorized to decrypt.

A first aspect of the present invention is an image encrypting method, comprising: a first process of inputting an image by reading an image file expressing the image; a second process of dividing said image file into portion image data of a predetermined unit; a third process of generating information incidental to said portion image data, said incidental information including boundary information which expresses boundary dividing respective said portion image data; and a fourth process of encrypting said portion image data, wherein image-handling of said portion image data is performed on the basis of said incidental information.

In accordance with the first aspect of the present invention, the image file expressing the image is read in the first process. In the second process, the read image file is decomposed into portion images of a predetermined unit. In the third process, at least information incidental to portion image data is generated. In the fourth process, security can be provided for image data by encrypting the image data. Further, even if a device, which stores the encrypted image file, is not authorized to decrypt the encrypted image file thus generated, the device can respond to a request for transmission for a portion of the image due to the information incidental to the image. For example, if codes which become marks (indicator) within the image data are stored as information incidental to the image, and/or if the byte locations at which the respective data start and the number of bytes of the respective data are stored as information incidental to the image, and this information incidental to the image is encrypted, even the device which is not authorized to decrypt can meet a request to transmit a portion of the image on the basis of the codes for marking, or the byte locations and numbers of bytes. Further, due to the transmission of only a portion of the image data, it becomes unnecessary to transmit all of the image data so that the processing rate can be improved.

A second aspect of the present invention is an image encrypting device, comprising: inputting means which inputs an image by reading an image file expressing the image; image portion unit dividing means which divides said image file into portion image data of a predetermined unit; encrypting means which encrypts said portion image data; identifier generating means which generates information incidental to said portion image data, said incidental information which expresses boundary dividing respective said portion image data; and file generating means which generates an image file on the basis of said portion image data encrypted by said encrypting means and said incidental information generated by said identifier generating means, wherein image-handling of said portion image data is performed on the basis of said incidental information.

In accordance with the second aspect of the present invention, an image file expressing an image is read by the inputting means. The read image file is divided into portion image data of a predetermined unit by the image portion unit dividing means, and is encrypted by the encrypting means. The identifier generating means generates information incidental to the image, for example, codes for marking, and byte locations from which the respective data start and numbers of bytes of the respective data, in the above-described image data. The file generating means generates a single image file from the information incidental to the image and the encrypted image data. As a result, the encrypted image file can provide security for encrypting image data.

Even if a device, which stores the encrypted image file, is not authorized to decrypt the encrypted image file thus generated, the device can respond to a request to transmit a portion of the image or the like due to the information incidental to image. For example, if codes which are marks within the image data are stored as information incidental to the image, or if the byte locations at which the respective data start and the number of bytes of the respective data are stored as information incidental to the image, and the information incidental to the image is also encrypted, even the device which is not authorized to decrypt can respond to a request for transmission of a portion of the image, on the basis of the codes for marking or the byte locations and number of bytes. Further, as described above, because only a portion of the image data is transmitted, it becomes unnecessary to transmit all of the image data so that the processing rate can be improved.

A third aspect of the present invention is a recording medium on which are recorded image encrypting procedures, comprising: a first step of inputting an image by reading an image file expressing the image; a second step of dividing said image file into portion image data of a predetermined unit; a third step of generating information incidental to said portion image data, said incidental information including boundary information which expresses boundary dividing respective said portion image data; a fourth step of encrypting said portion image data; and a fifth step of image-handling image data on the basis of said incidental information.

In accordance with the third aspect of the present invention, in the first step, an image file expressing an image is read. In the second step, the read image file is divided into portion image data of a predetermined unit. In a third step, information incidental to the image is generated. The information incidental to the image may be, for example, codes which are marks within the image data, byte locations at which the respective data start and the numbers of bytes of the respective data, or the like. In the fourth step, the portion image data which was obtained by the division in the second step is encrypted. In the fifth step, a single encrypted image file is generated from the information incidental to the image generated in the third step, and the image data encrypted in the fourth step. In the encrypted image file generated by these procedures, since the image data is encrypted, security can be provided for the image data. Further, even if a device, which stores encrypted image file, is not authorized to decrypt the encrypted image file thus generated, due to the information incidental to image, the device can respond to a request for transmission of a portion of the image or the like. For example, if codes which are markers within the image data are stored as information incidental to the image, or if the byte locations at which the respective data start and the number of bytes of the respective data are stored as information incidental to the image, and the information incidental to the image is encrypted, even the device which is not authorized to decrypt can meet a request to transmit only a portion of the image, on the basis of the codes which are marks, or on the basis of the byte locations and numbers of bytes. Further, by transmitting only a portion of the image data in this way, there is no need to transmit all of the image data so that the processing rate can be improved.

A fourth aspect of the present invention is a recording medium on which an encrypted image file is recorded, said encrypted image file being generated by a first process of inputting an image by reading an image file expressing the image; a second process of dividing said image file into portion image data of a predetermined unit; a third process of generating information incidental to said portion image data, said incidental information including boundary information which expresses boundary dividing respective said portion image data; and a fourth process of encrypting, per predetermined unit, image data which has been divided into said predetermined unit.

In accordance with the fourth aspect of the present invention, in the first process, an image file expressing image is read. In the second process, the read image file is divided into portion image data of a predetermined unit. In the third process, information incidental to the image is generated. The information incidental to the image may be, for example, codes which are marks within the image data, byte locations at which the respective data start and the number of bytes of the respective data, or the like. In the fourth process, the portion image data obtained by the division of the second process is encrypted. In the encrypted image file which has been generated by such a method as described above, since the image data is encrypted, security can be provided for the image data. Further, even if a device, which stores the encrypted image file, is not authorized to decrypt the encrypted image file thus generated, due to the information incidental to image, the device can respond to a request for transmission of a portion of the image or the like. For example, if codes which are marks within the image data are stored as information incidental to the image, or if the byte locations at which the respective data start and the number of bytes of the respective data are stored as information incidental to the image, and the information incidental to the image is encrypted, even the device which is not authorized to decrypt can meet a request to transmit only a portion of the image, on the basis of the codes which are marks, or on the basis of the byte locations and numbers of bytes. Further, by transmitting only a portion of the image data in this way, there is no need to transmit all of the image data so that the processing rate can be improved.

DESCRIPTION OF THE PREFERRED EMBODIMENTS

Figure 1:
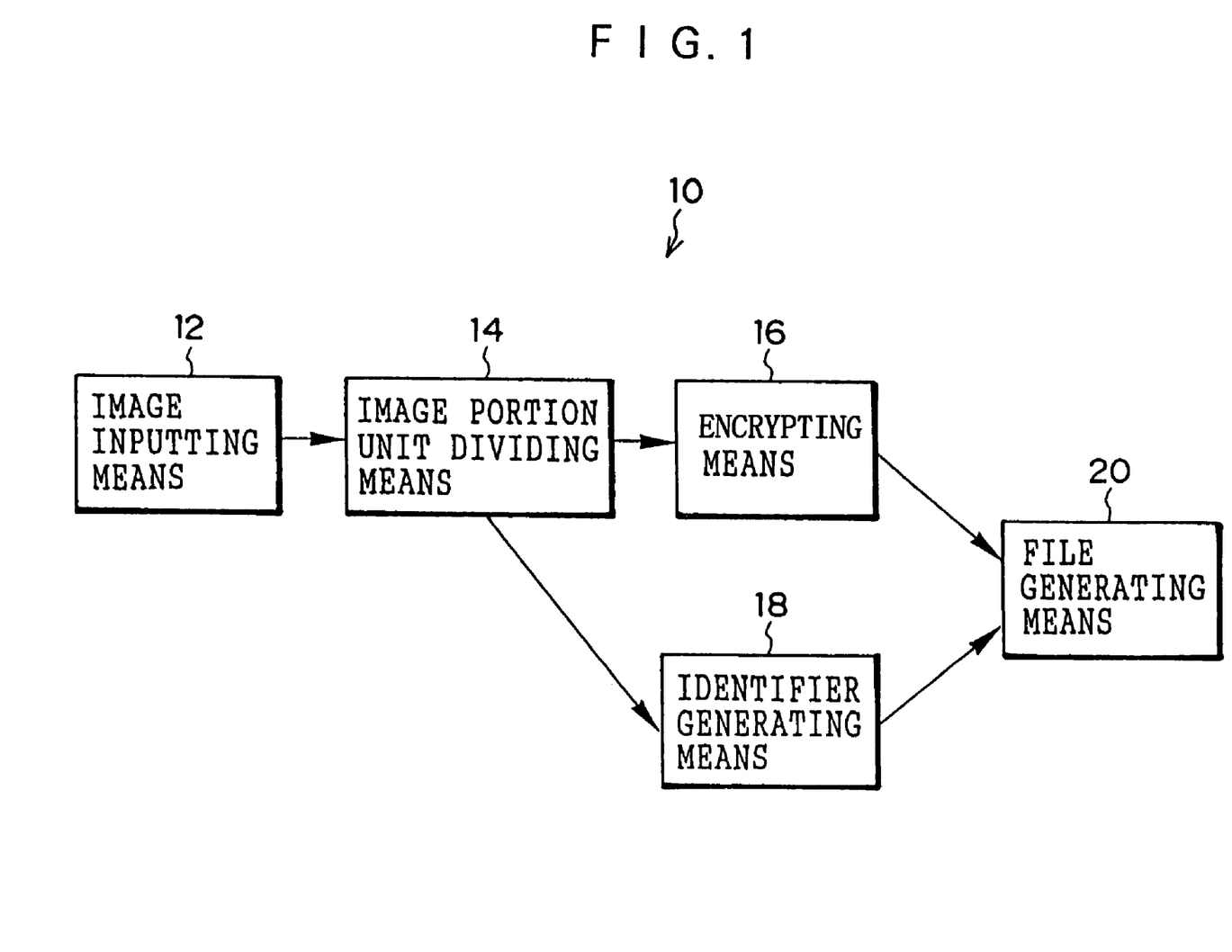
FIG. 1 is a block view illustrating an example of the structure of an image encrypting device according to an embodiment of the present invention.

With reference to the accompanying drawings, a detailed description of an example of an embodiment of the present invention will be given hereinafter. FIG. 1 is a schematic block view of an image encrypting device 10 of the present embodiment.

As is shown in FIG. 1, the image encrypting device 10 comprises: an image inputting means 12 which inputs an image file of an RGB color image; an image portion unit dividing means 14 which decomposes the image file into image data for each of the channels of R, G, and B, and divides the image data of each R, G and B channel into small regions (each of which is referred to as a tile) of a predetermined size; an encrypting means 16 which carries out encrypting for each tile; an identifier generating means 18 which assigns No. (i.e., an (identification) number, hereinafter a number) to each of the divided tiles; and a file generating means 20 which generates a single image file from image data for the each tile encrypted by the encrypting means 16 and the number of the tile of the identifier generated by the identifier generating means 18.

The image inputting means 12 reads image data from various inputting devices for inputting image. For example, an information storage medium reading device, a communication control device, or the like can be employed as an inputting device. An information storage medium, for example, a magnetic disk such as a floppy disk (FD), an optical disk such as a CD-R, a magneto-optic disk (MO), a digital still camera (DSC, which is simply referred to as a "digital camera" hereinafter), or the like is set at the information storage medium reading device, and the device reads and inputs image data stored in the set information storage medium. The communication control device receives and inputs image data transmitted from another information processing device connected thereto via a communication line.

Figure 2A:
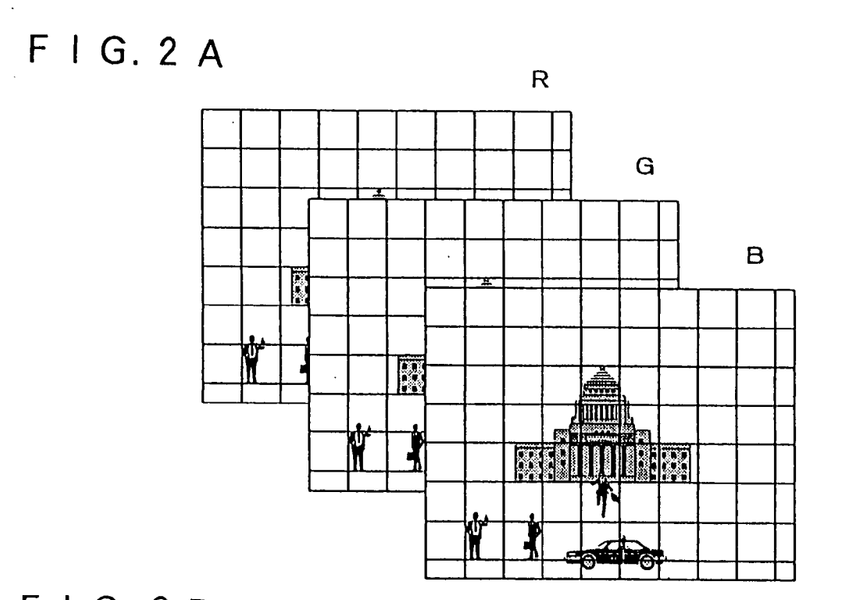
FIGS. 2A and 2B are views illustrating the data structure of an image file according to the present embodiment.

When an image file read by the image inputting means 12 is formed of RGB color image data, as is shown in FIG. 2A, the image portion unit dividing means 14 divides the RGB color image data into image data of each of the channels of the R, G, and B component colors, further divides the image data of each channel into tile units of a predetermined size, and then outputs the resulting image data to the encrypting means 16. Thus, image data is divided into tile unit so that image enlargement and reduction involved in trimming processing or the like can be facilitated and performed at high speed. For example, when the central portion of an image is to be enlarged 2×, it suffices to access only the minimum tiles needed for the image whose resolution is one grade higher than the image whose central portion is to be enlarged, thus allowing the image to be edited in an appropriate manner even by a CPU of low capacity.

The encrypting means 16 performs encrypting for each tile on the basis of image data which has been divided into the tile units by the image portion unit dividing means 14. Examples of encrypting methods include a public key system, a common key system, and the like. In addition, it is possible for the encrypted data obtained by the encrypting means 16 to not correspond to the number of pixels contained in the tile and to be variable-length data.

The identifier generating means 18 assigns a number to each tile into which the image data has been divided by the image portion unit dividing means 14. For example, the identifier generating means 18 assigns the numbers (tile numbers) in such a manner that the tile at the first line and the first column of the R channel is R11, and the tile at the nth line and the mth column of the G channel is Gnm. The identifier generating means 18 also generates a marker and a header including information incidental to the image and information which is used by the operator, who handles the image, to decrypt, and the like (see FIG. 2B).

Figure 2B:
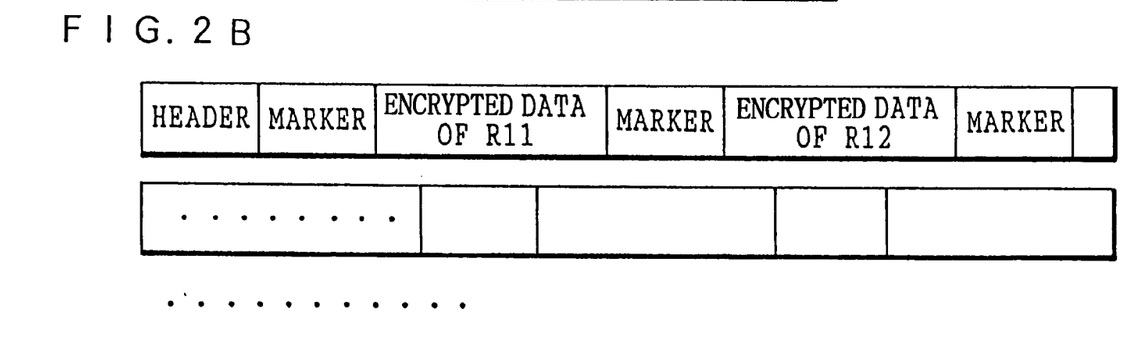

The file generating means 20 generates an encrypted image file by generating a single image file from the tiles encrypted by the encrypting means 16 and from the numbers which are assigned to the tiles and information incidental to the image, or the like, generated by the identifier generating means 18. Further, the data structure of the encrypted image file is structured as shown in FIG. 2B.

The data structure of the encrypted image file is structured by arraying the following data in the following order: a header in which information incidental to the image or information used by the operator for decrypting is included, a marker for stipulating the address of the image data, image data for each channel, a marker, image data for each channel, a marker, image data for each channel, and the like. Moreover, during the encrypting, coding should be performed so as not to generate a code corresponding to a marker. For example, one byte can be expressed by a hexadecimal number of from 00 to FF. However, FF is used as a marker, or otherwise is not used. (FF should not be used to as a code within the image data.) For this reason, for example, the encrypted data, 00 to FD are used as they are for the encrypted data, and FE is increased to 2 bytes and is then converted into FE00, while FF is converted into FE01. By doing so, FF is not used. Accordingly, when the encrypted image data is decrypted afterwards, it is determined whether this FE is FF or FE by checking the next byte.

Figure 3:
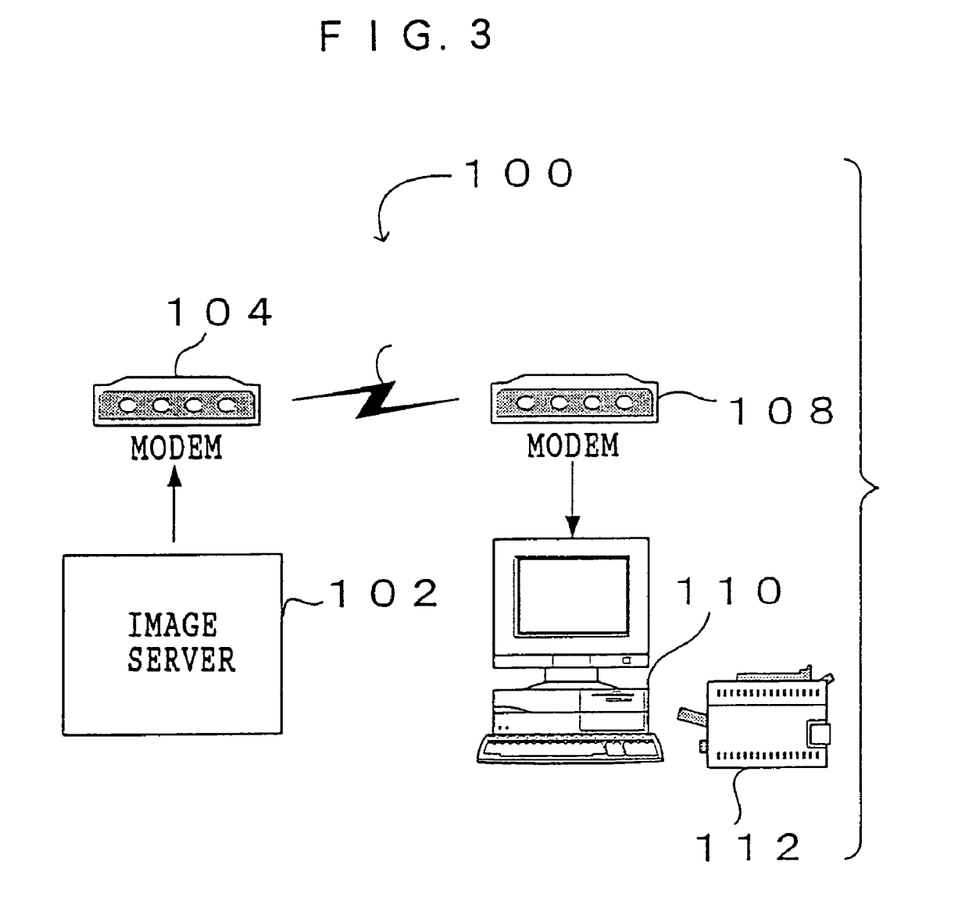
FIG. 3 is a view illustrating an example of a system to which image data encrypted by the image encrypting device is applied.

With reference to FIG. 3, an example of the structure of an image-handling system 100 using the image data which has been encrypted as described above will be briefly explained in a simple manner hereinafter.

The image-handling system 100 comprises: an image server 102 which stores therein the image file encrypted by the image encrypting device 10; a modem 104 for communication for transmitting the image data read from the image server 102; a communication line 106 which transmits image data; a modem 108 for communication for receiving the image data transmitted from the image server 102 through the modem 104 for communication and the communication line 106; a personal computer 110 with which the operator performs image processing operations; and a printer 112 which outputs an image which has been subjected to image processings by the personal computer 110.

Operation of the present embodiment will now be explained.

The image inputting means 12 of the image encrypting device 10 reads an image file from the information storage medium reading device or the communication control device. The information storage medium reading device has set therein an information storage medium, for example, a magnetic disk such as a floppy disk (FD), an optical disk such as a CD-R, a magneto-optic disk (MO), a digital camera, or the like, and reads and inputs the image data stored in the set information storage medium. The communication control device receives and inputs image data transmitted from another information processing device connected thereto via a communication line. Then, the image file is divided into image data for each of the channels of the component colors R, G, and B by the image portion unit dividing means 14. Image data for each R, G, or B channel is further divided into image data of tile units. Image data for each tile is outputted to the encrypting means 16 and the identifier generating means 18. The encrypting means 16 performs encrypting processing on the respective image data which have been divided into the tile units, and outputs the encrypted image data to the file generating means 20. The identifier generating means 18 assigns a number to each tile of the image data which has been divided into the units, which number represents the address of the tile. Further, the identifier generating means 18 generates information incidental to image, information used by the operator for decrypting, or the like, which are outputted to the file generating means 20.

The file generating means 20 generates, as a single image file, image data which has been encrypted by the encrypting means 16 and whose address has been stipulated and for which information incidental to the image or the like has been generated by the identifier generating means 18. Then, the encrypted image file is stored in the image server 102.

The encrypted image file stored in the image server 102 is fetched by the operator via the modems 104 and 108 for communication and the communication line 106. At this time, provided that the image server 102 is not authorized to decrypt while only the operator is authorized to decrypt, security can be provided with respect to the image server 102, the modems 104 and 108 for communication, and the communication line 106.

Judging from the contents of the header formed in the encrypted image file, the operator recognizes into what unit the image data has been divided, and can determine between which marker and which marker the necessary image data is located. Then, the operator requests the transmission of the xth data unit on the basis of this information. In response to this request, the image server 102 counts the number of markers (FF) while scanning the image file. When the image server 102 reaches the xth marker FF, it transmits to the operator the data locating from the byte next to this FF to the subsequent FF. The operator decrypts the received image data, and performs image processing. As described above, even if the image server 102 is not authorized to decrypt, it can respond to the above-described request by counting the number of markers while scanning the image file so that the requested necessary portion of image data can be transmitted and the transmission rate can be improved.

Another example of the structure of the encrypted image file will now be explained.

Figure 4:
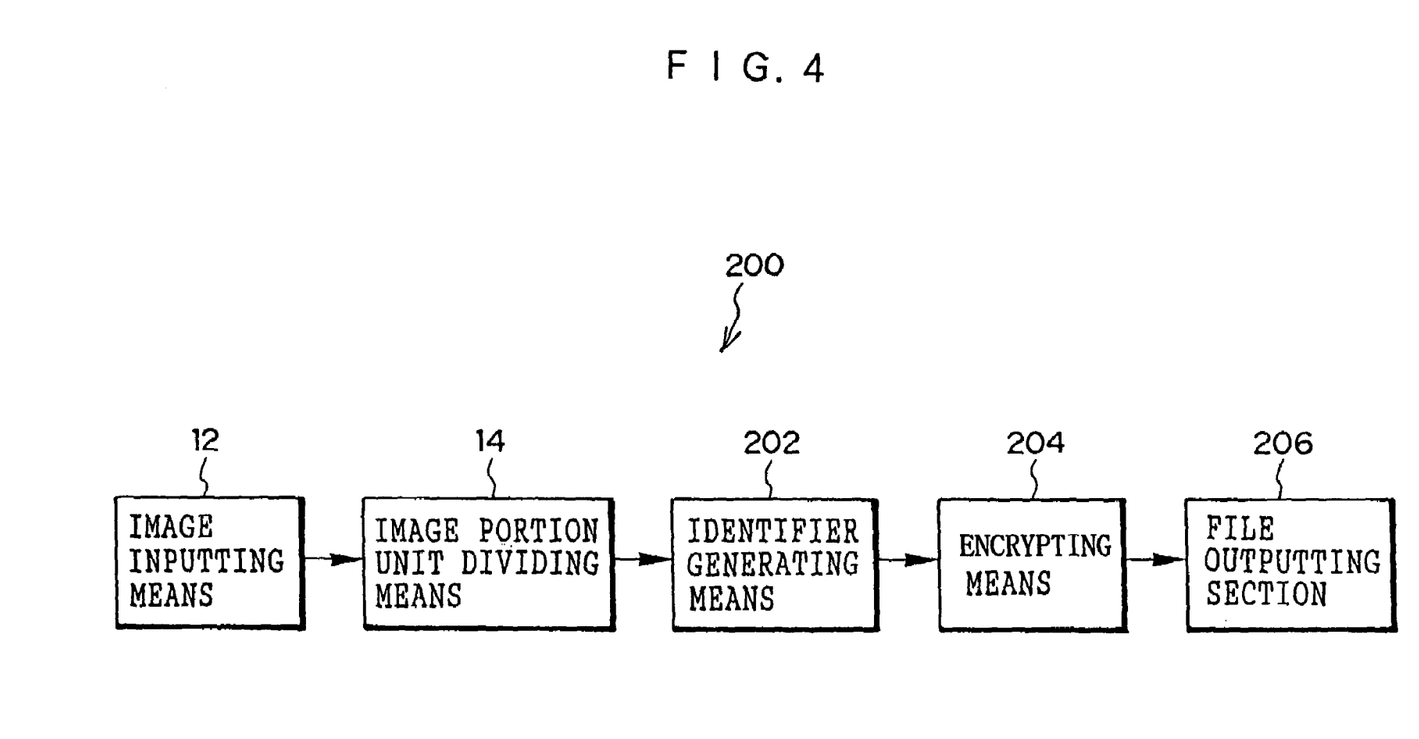
FIG. 4 is a block view illustrating an example of the structure of the image encrypting device according to the present embodiment.

FIG. 4 shows an image encrypting device 200 which generates an encrypted image file which is structured differently from the above-described encrypted image file. As is shown in FIG. 4, this image encrypting device 200 is structured by the image inputting means 12, the image portion unit dividing means 14, an identifier generating means 202, an encrypting means 204, and a file outputting section 206 being disposed in that order.

Since the image inputting means 12 and the image portion unit dividing means 14 are identical to those in the above-described example, description thereof will be omitted.

The identifier generating means 202 assigns a number to each tile which has been divided into tile units from the image data by the image portion unit dividing means. For example, each tile number is assigned such that the tile at the first line and the first column of the R channel is R11, and the tile at the nth line and the mth column of the G channel is Gnm. Further, a list which lists, for each data (tile) unit, the byte location at which the data unit starts and the number of bytes of the image data, is inputted into the header which is for the input of information incidental to the image, thus generating an image file. In this case, no markers are needed.

In the encrypting means 204, the image file generated in the identifier generating means 202 is encrypted, and the image file encrypted by the encrypting means 204 is outputted to the file outputting section 206. In the present embodiment, not only the image data for each channel but also the header are encrypted. Accordingly, if a operator who is not authorized to decrypt tries to handle the image file, the operator cannot obtain the information regarding the arrangement of the respective data, and therefore, security is maintain.

Operation of the image encrypting device 200 will now be explained.

As described above, the image inputting means 12 of the image encrypting device 200 reads an image file from the information storage medium reading device or the communication control device. The information storage medium reading device has an information storage medium, for example, a magnetic disk such as a floppy disk (FD), an optical disk such as a CD-R, a magneto-optic disk (MO), or a digital camera set therein, and reads and inputs the image data stored in the set information storage medium. The communication control device receives and inputs image data transmitted from another information processing device connected thereto via a communication line. The read image file is outputted to the image portion unit dividing means 14, is divided into channel image data for each component color of R, G, and B. The respective RGB channel image data are further divided into tile units, and are outputted to the identifier generating means 202.

In the identifier generating means 202, a number is assigned to each tile into which the image data is divided, and a header for the input of information incidental to the image is generated so that an image file is created. The image file thus created is by requesting that the image server 102 transmits the image data of that number of bytes from that byte location. The obtained image data is decrypted by the operator and used.

Even if the image server 102 is not authorized to decrypt, since the operator who is authorized to decrypt can specify the byte location and the number of bytes of the image file, it is possible to transmit only the requested necessary portion of the image data, and the transmission rate can be improved.

Figure 5:
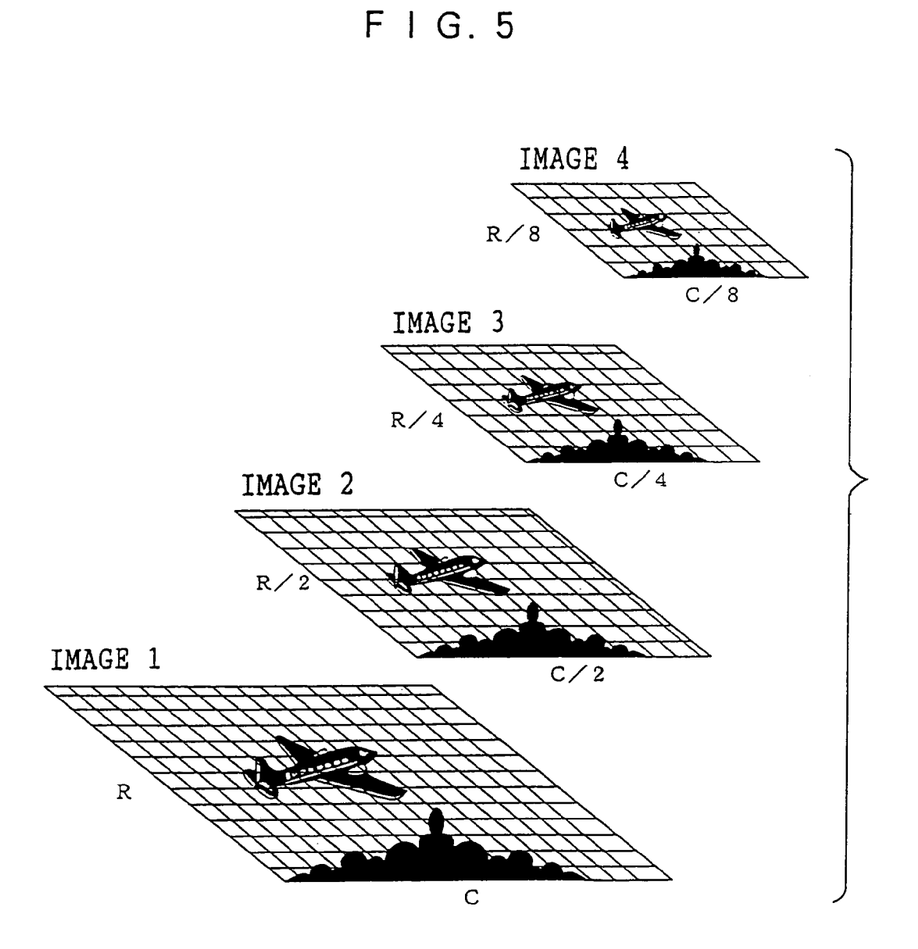
FIG. 5 is a view illustrating an example of the data structure of the image file according to the present embodiment.

In the above description, the data structures of the image files which are generated by the image encrypting device 10 and the image encrypting device 200 of the present embodiment are such that image data for each channel of R, G, and B is divided into tiles of a predetermined size, as shown in FIG. 2A. Instead, a data structure may be used in which image data is divided into tiles of a predetermined size using the set of R, G, and B colors as they are. Alternatively, as is shown in FIG. 5, the data structure of the image file may be formatted such that it contains a plurality of different resolutions (pixel densities) for each channel of the R, G, and B colors and each is divided into tiles of a predetermined size (such formatting is referred to as FlashPix). In FlashPix, for example, as is shown in FIG. 5, given that each of image data having respectively different numbers of pixels encrypted by the encrypting means 204 with respect to the image data and the header to which includes information incidental to the image, and the encrypted image file is outputted to the file outputting section 206. The file outputting section 206 stores the encrypted image file in a storage medium such as an image server, a CD-R, or the like.

A case in which the image file encrypted by the image encrypting device 200 is applied to the image handling system 100 shown in FIG. 3 will now be explained.

The encrypted image file which has been stored in the image server 102 is fetched by the operator through the modems 104 and 108 for communication and the communication line 106. At this time, provided that the image server 102 is not authorized to decrypt and only the operator is authorized to decrypt, security can be provided with respect to the image server 102, the modems 104 and 108 for communication, and the communication line 106.

At an initial stage of the encrypting processing, the operator reads only the header from the imager server 102, decrypts it, and can thereby recognize the location of information in the image file. Then, the operator determines the byte location and the number of bytes for each of the needed data units, and obtains image data contains a number of pixels respectively reduced by ½ along a lengthwise direction R and a widthwise direction C (such that the image is formed by a quarter of the number of the pixels), image data of image 4, image data of image 3–2×image 4, image data of image 2–2×image 3, and image data of image 1–2×image 2 are stored. Thus, even if all of the image data of the respective pixels is not stored, the image data of the requested number of pixels can be obtained, and the image data can be compressed. Further, by structuring the data structure of the image file as described above, it is possible to change the outputted resolution to an optimal value so as to correspond to the resolution of the outputting device. For example, when an image is outputted to a CRT display, the image at a low resolution can be used, and when this image is outputted to a printer, the image at a high resolution can be used.

In accordance with the present embodiment, the data structure of the image files which are generated by the image encrypting devices 10 and 200 is such the image is divided into tile units of a predetermined size. However, the present invention is not limited to this, and instead, the above-described FlashPix formatting can be used. Or, the image may be divided into line units, channel units, bit plane units, may be divided per resolution after having been divided into a plurality of resolutions, or the like.

The image encrypting procedures according to the present embodiment may be recorded on a recording medium such as a floppy disk, a hard disk, a CD-R, or the like as a program to be executed at a computer, and then distributed.

What is claimed is:

1. An image encrypting method, comprising:
    a first process of inputting an image by reading an image file expressing the image;
    a second process of dividing said image file into portion image data of a predetermined unit;
    a third process of generating information incidental to said portion image data, said incidental information including boundary information which expresses a boundary dividing respective said portion image data; and
    a fourth process of encrypting every said portion image data to provide every said portion image data with security so that unauthorized access to the portion image data cannot be obtained without decrypting,
    wherein image-handling of said portion image data is performed by using said incidental information so that the image-handling is performed while said portion image data remains encrypted.

2. The image encrypting method according to claim 1, further comprising: a fifth process of generating an encrypted image file from encrypted portion image data generated in said fourth process and said incidental information generated in said third process.

3. The image encrypting method according to claim 2, wherein said encrypted image file includes a plurality of marking means, each of said marking means being attached to respective said encrypted portion image data so as to identify respective boundaries between said encrypted portion image data in said encrypted image file.

4. The image encrypting method according to claim 1, wherein said incidental information is encrypted, and an encrypted image file including encrypted portion image data and encrypted incidental information is generated in said fourth process.

5. The image encrypting method according to claim 4, wherein said incidental information includes each position information of respective said encrypted portion image data in said encrypted image file and each size information of respective said encrypted portion image data.

6. A recording medium on which are recorded image encrypting procedures, comprising:
    a first step of inputting an image by reading an image file expressing the image;
    a second step of dividing said image file into portion image data of a predetermined unit;
    a third step of generating information incidental to said portion image data, said incidental information including boundary information which expresses a boundary dividing respective said portion image data;
    a fourth step of encrypting every said portion image data to provide every said portion image data with security so that unauthorized access to the portion image data cannot be obtained without decryption; and
    a fifth step of image-handling said portion image data by using said incidental information so that the image-handling is performed while said portion image data remains encrypted.

7. The recording medium on which are recorded image encrypting procedures according to claim 6, further comprising: a sixth step of generating an encrypted image file from encrypted portion image data generated in said fourth step and said incidental information generated in said third step.

8. The recording medium on which are recorded image encrypting procedures according to claim 7, wherein said encrypted image file includes a plurality of marking means, each of said marking means being attached to respective said encrypted portion image data so as to identify respective boundaries between said encrypted portion image data in said encrypted image file.

9. The recording medium on which are recorded image encrypting procedures according to claim 6, wherein said incidental information is encrypted, and an encrypted image file including encrypted portion image data and encrypted incidental information is generated in said fourth step.

10. The recording medium on which are recorded image encrypting procedures according to claim 9, wherein said incidental information includes each position information of respective said encrypted portion image data in said encrypted image file and each size information of respective said encrypted portion image data.

11. A recording medium on which an encrypted image file is recorded, said encrypted image file being generated by:
    a first process of inputting an image by reading an image file expressing the image;
    a second process of dividing said image file into portion image data of a predetermined unit;
    a third process of generating information incidental to said portion image data, said incidental information including boundary information which expresses a boundary dividing respective said portion image data; and
    a fourth process of encrypting, per predetermined unit, every said portion image data which has been divided into said predetermined unit to provide every said portion image data with security so that unauthorized access to said portion image data cannot be obtained without decryption,
    a fifth process of image-handling said portion image data by using said incidental information so that the image-handling is performed while said portion image data remains encrypted.

12. The recording medium on which an encrypted image file is recorded according to claim 11, said encrypted image file being generated by a fifth process of generating said encrypted image file from encrypted portion image data generated in said fourth process and said incidental information generated in said third process.

13. The recording medium on which an encrypted image file is recorded according to claim 12, wherein said encrypted image file includes a plurality of marking means, each of said marking means being attached to respective said encrypted portion image data so as to identify respective boundaries between said encrypted portion image data in said encrypted image file.

14. The recording medium on which an encrypted image file is recorded according to claim 11, wherein said incidental information is encrypted, and said encrypted image file including encrypted portion image data and encrypted incidental information is generated in said fourth process.

15. The recording medium on which an encrypted image file is recorded according to claim 14, wherein said incidental information includes each position information of respective said encrypted portion image data in said encrypted image file and each size information of respective said encrypted portion image data.

16. An image encrypting device, comprising:
   inputting means which inputs an image by reading an image file expressing the image;
   image portion unit dividing means which divides said image file into portion image data of a predetermined unit;
   encrypting means which encrypts every said portion image data to provide every said portion image data with security so that unauthorized access to said portion image data cannot be obtained without decryption;
   identifier generating means which generates information incidental to said portion image data, said incidental information which expresses a boundary dividing respective said portion image data; and
   file generating means which generates an image file on the basis of said portion image data encrypted by said encrypting means and said incidental information generated by said identifier generating means,
   wherein image-handling of said portion image data is performed by using said incidental information so that the image-handling is performed while said portion image data remains encrypted.

17. The image encrypting device according to claim 16, wherein the image file generated by said generating means is an encrypted image file.

18. The image encrypting device according to claim 17, wherein said encrypted image file includes a plurality of marking means, each of said marking means being attached to respective encrypted portion image data so as to identify respective boundaries between said encrypted portion image data in said encrypted image file.

19. The image encrypting device according to claim 16, wherein said encrypting means encrypts said incidental information, and said file generating means generates the image file on the basis of said portion image data encrypted by said encrypting means and said incidental information encrypted by said encrypting means.

20. The image encrypting device according to claim 19, wherein said incidental information includes each position information of respective encrypted portion image data in said encrypted image file and each size information of respective encrypted portion image data.

* * * * *